(12) United States Patent
Wiegenstein et al.

(10) Patent No.: US 8,402,547 B2
(45) Date of Patent: Mar. 19, 2013

(54) APPARATUS AND METHOD FOR DETECTING, PRIORITIZING AND FIXING SECURITY DEFECTS AND COMPLIANCE VIOLATIONS IN SAP® ABAP™ CODE

(75) Inventors: Andreas Wiegenstein, Mannheim (DE); Markus Schumacher, Einhausen (DE); Xu Jia, Heidelberg (DE)

(73) Assignee: Virtual Forge GmbH, Heidelberg (DE)

( * ) Notice: Subject to any disclaimer, the term of this patent is extended or adjusted under 35 U.S.C. 154(b) by 168 days.

(21) Appl. No.: 13/046,257

(22) Filed: Mar. 11, 2011

(65) Prior Publication Data

US 2012/0017280 A1 Jan. 19, 2012

Related U.S. Application Data

(60) Provisional application No. 61/313,765, filed on Mar. 14, 2010.

(51) Int. Cl.
G06F 11/30 (2006.01)
G06F 9/44 (2006.01)

(52) U.S. Cl. ............ 726/25; 717/127; 717/143
(58) Field of Classification Search .............. None
See application file for complete search history.

(56) References Cited

U.S. PATENT DOCUMENTS

| | | | | |
|---|---|---|---|---|
| 6,092,194 | A * | 7/2000 | Touboul | 726/24 |
| 7,207,065 | B2 | 4/2007 | Chess et al. | |
| 7,240,332 | B2 * | 7/2007 | Berg et al. | 717/126 |
| 7,284,274 | B1 * | 10/2007 | Walls et al. | 726/25 |
| 7,398,516 | B2 * | 7/2008 | Berg et al. | 717/126 |
| 7,404,212 | B2 * | 7/2008 | Radatti et al. | 726/24 |
| 7,418,734 | B2 * | 8/2008 | Berg et al. | 726/25 |
| 7,607,172 | B2 * | 10/2009 | Zurko et al. | 726/24 |
| 7,669,238 | B2 * | 2/2010 | Fee et al. | 726/22 |
| 2005/0240999 | A1 * | 10/2005 | Rubin et al. | 726/22 |
| 2007/0061782 | A1 * | 3/2007 | Schreiner et al. | 717/124 |
| 2007/0180531 | A1 * | 8/2007 | Snover et al. | 726/25 |
| 2007/0226797 | A1 * | 9/2007 | Thompson et al. | 726/22 |
| 2008/0120604 | A1 * | 5/2008 | Morris | 717/128 |
| 2008/0313602 | A1 * | 12/2008 | Tillmann et al. | 717/106 |
| 2009/0293127 | A1 * | 11/2009 | Zurko et al. | 726/24 |

OTHER PUBLICATIONS

"SAP NetWeaver Application Server ABAP Security Guide", Oct. 24, 2005, SAP AG, Document Version 1.00, p. 1-85.*
"Secure Programming—ABAP", May 2006, SAP AG, Document Version 1.00, p. 1-50.*
Bohm, C. & Jacopini, G. "Flow diagrams, turing machines and languages with only two formation rules" Communications of the ACM, 9(5): 366-371, May 1966.
Chess, B & McGraw, G. "Static analysis for security," IEEE Security and Privacy, 2(6): 76-79, 2004.

(Continued)

*Primary Examiner* — Christopher Revak
(74) *Attorney, Agent, or Firm* — Gifford, Krass, Sprinkle, Anderson & Citkowski, P.C.

(57) ABSTRACT

A static code analysis (SCA) tool, apparatus and method detects, prioritizes and fixes security defects and compliance violations in SAP® ABAP™ code. The code, meta information and computer system configuration settings are transformed into an interchangeable format, and parsed into an execution model. A rules engine is applied to the execution model to identify security and compliance violations. The rules engine may include information about critical database tables and critical SAP standard functions, and the step of applying the rules engine to the execution model may include the calculation of specific business risks or whether a technical defect has a business-relevant impact. In particular, an asset flow analysis may be used to determine whether critical business data is no longer protected by the computer system. Such critical business data may include credit or debit card numbers, financial data or personal data.

17 Claims, 6 Drawing Sheets

OTHER PUBLICATIONS

Cousot, P. & Cousot, R. "Abstract interpretation: a unified lattice model for static analysis of programs by construction or approximation of fixpoints." ACM POPL 1977.

Dahl, Dijkstra, and Hoare. *Structured Programming*. London: Academic Press, 1972.

Livshits, B. "Static techniques for security," Section 7.3 in *Improving Software Security with Precise Static and Runtime Analysis*, Stanford University, Dec. 2006.

Nielson, H., Nielson, F. & Hankin, C. *Principles of Program Analysis*. Berlin: Springer, 1999.

Schumacher, M. *Security Engineering with Patterns: Origins, Theoretical Model, and New Applications*, Lecture Notes in Computer Sciences 2754, Springer Verlag: 2003, pp. 153-154.

Zahn, C.T. "A control statement for natural top-down structured programming" presented at Symposium on Programming Languages, Paris, 1974.

Keller, H. & Thummel, W.H. *Official ABAP Programming Guidelines*. SAP Press: 2009.

* cited by examiner

FIG. 3

Class ZVF_PATENT (aggregated)

CLASS zvf_patent DEFINITION PUBLIC FINAL.

PUBLIC SECTION.
PROTECTED SECTION.
PRIVATE SECTION.

DATA at_check_on TYPE i VALUE 1.
DATA request         TYPE REF TO if_http_request.

METHOD z_example_issue

METHOD z_example_sink
    IMPORTING
        accnt TYPE string
        tab    TYPE string

IMPLEMENTATION

METHOD z_example_issue.
    DATA : lv_accnt TYPE string.

lv_accnt = request->get_form_field( 'accnt' ).

CALL METHOD z_example_sink
        EXPORTING
            tab     = '2'
            accnt = lv_accnt.
ENDMETHOD.

METHOD z_example_sink

DATA : lv_where TYPE string.
    DATA : lv_tab   TYPE string.

CONCATENATE 'BNAME = sy-uname AND ACCNT = '''
        accnt ''' ' INTO lv_where.

IF at_check_on = 1.
        CONCATENATE lv_where ' AND LOCNT = 0' INTO lv_where.
    ENDIF.

CONCATENATE 'USR' tab INTO lv_tab.
    UPDATE (lv_tab) SET MODBE = sy-uname WHERE
        BNAME = sy-uname.

DELETE FROM USR02 WHERE (lv_where).
ENDMETHOD.
ENDCLASS.

FIG. 4

Internal Format [201] of class ZVF_PATENT

ZVF_TC;CLAS;ZVF_PATENT;na;20110206;0001;,,$1,ZVF_PATENT,4,$2,REQUEST,IF_HTTP_REQUEST
$2,AT_CHECK_ON,I$3,METHOD z_example_sink. DATA : lv_where TYPE string.\n DATA :lv_tab TYPE string.\n CONCATENATE 'BNAME = sy-uname AND ACCNT = '" accnt '" INTO lv_where.\n IF at_check_on = 1.\n CONCATENATE lv_where 'AND LOCNT = 0' INTO lv_where.\n ENDIF.\n CONCATENATE 'USR' tab INTO lv_tab.\n UPDATE (lv_tab) SET modbe = sy-uname WHERE bname = sy-uname.\n DELETE FROM usr02 WHERE (lv_where).\
nENDMETHOD.$4,Z_EXAMPLE_SINK,1,,,$5,ACCNT,1,STRING,1$5,TAB,1,STRING,1$3,METHOD z_example_issue.\n DATA :lv_accnt TYPE string.\n lv_accnt = request->get_form_field_( 'accnt' ).\n CALL METHOD z_example_sink\n EXPORTING\n  accnt = lv_accnt.\nENDMETHOD.\
n4,Z_EXAMPLE_ISSUE,1,,,$

FIG. 5

Data Flow Chart#1 (Untrusted Source)

```
 0  METHOD z_example_issue.
 1
 2     DATA : lv_accnt TYPE string.
 3
 4     lv_accnt = request->get_form_field ( 'accnt' ).
 5
 6     CALL METHOD z_example_sink
 7        EXPORTING
 8           tab    = '02'
 9           accnt  = lv_accnt.
10
11  ENDMETHOD.
```

| Method Parameters (meta data) | | |
|---|---|---|
| ACCNT | TYPE | STRING |
| TAB | TYPE | STRING |

```
 0  METHOD z_example_sink.
 1
 2     DATA : lv_where TYPE string.
 3     DATA : lv_tab   TYPE string.
 4
 5     CONCATENATE 'BNAME = sy-uname AND ACCNT = '"
 6                     accnt' ' ' INTO lv_where.
 7
 8     IF AT_check_on = 1.
 9     CONCATENATE lv_where ' AND LOCNT = 0' INTO lv_where.
10     ENDIF.
11
12     CONCATENATE 'USR' tab INTO lv_tab.
13     UPDATE (lv_tab) SET modbe = sy-uname
14         WHERE bname = sy-uname
15
16     DELETE FROM USR02 WHERE (lv_where).
17
18  ENDMETHOD.
```

Data / Flow Chart #2 (Insecure API)

Method  Parameters (meta data)
*ACCNT*  TYPE  STRING
*TAB*    TYPE  STRING

```
0   METHOD z_example_sink.
1
2   DATA : lv_where TYPE string.
3   DATA : lv_tab    TYPE string.
4
5   CONCATENATE 'BNAME = sy-uname AND ACCNT = '''
6              accnt ''' ' INTO lv_where.
7
8   IF AT_check_on = 1.
9   CONCATENATE lv_where ' AND LOCNT = 0' INTO lv_where.
10  ENDIF.
11
12  CONCATENATE 'USR' tab INTO lv_tab.
13  UPDATE (lv_tab) SET modbe = sy-uname
14     WHERE bname = sy-uname
15
16    DELETE FROM USR02 WHERE ( ).
17
18  ENDMETHOD.
```

FIG. 7

APPARATUS AND METHOD FOR DETECTING, PRIORITIZING AND FIXING SECURITY DEFECTS AND COMPLIANCE VIOLATIONS IN SAP® ABAP™ CODE

REFERENCE TO RELATED APPLICATION

This application claims priority from U.S. Provisional Patent Application Ser. No. 61/313,765, filed Mar. 14, 2010, the entire content of which is incorporated herein by reference.

FIELD OF THE INVENTION

This invention relates generally to static code analysis (SCA) and, in particular, to a SCA tool for identifying, prioritizing and repairing security and compliance defects in SAP® ABAP™ software applications.

BACKGROUND OF THE INVENTION

Software applications which contain vulnerabilities can lead to security or compliance breaches. If this occurs, the business of the organization running the application is endangered through loss of critical/protected data, loss of reputation, loss of business, lawsuits, etc. Therefore, it is industry best practice today to apply dedicated tools for analyzing the software to effectively mitigate these risks.

A standard method for looking for security defects is Static Code Analysis (SCA). There are SCA tools for most programming languages available. However, there is currently no SCA tool for finding security and compliance issues in SAP® ABAP™ applications. This is critical for many reasons. Most (>90%) of SAP® applications are written in ABAP™, SAP®'s own proprietary programming language, and SAP® applications often process the key assets of an organization, such as personal data, production data (intellectual property) and financial data—often the most valuable and sensitive information of an organization. If this data is manipulated by exploiting vulnerabilities in the application, the impact is severe.

SAP® applications are increasingly connected to external computer systems and are accessible by a continuously growing user base. This means that the exposure of SAP® computer systems to external vulnerabilities has grown as well. SAP® applications are more in the focus of hackers, such that the likelihood for attacks increases.

As of today, existing SCA tools cannot:
Hook into the ABAP™ compiler, as this is a proprietary compiler developed by SAP®.
Mimic the ABAP™ compiler, as this is a proprietary compiler developed by SAP® with little information available.
Perform data flow analysis on ABAP™ for testing of security defects and compliance violations.
Identify authorization violations in connection with business operations, as other languages have no consistent/standard authentication and authorization mechanism and no pool of standard business functions and standard database tables.
Analyze defects or compliance violations in a business context, as other languages are not consistently embedded into a business application framework that would allow drawing such conclusions.
Identify access to critical business data in a database based on knowledge of critical standard database tables.

SCA has been an established concept for many years (see, for example, [2, 3, 7]). Key characteristics of today's SCA tools based on those principles are as follows:
They are mostly hooked into the compiler framework of a target language and make use of existing compiler functionality.
Most scanners analyze the Bytecode (as opposed to the source code).
They convert language-specific code (from several languages) into a common (language independent) model/format.
They analyze data flow, control flow and perform a propagation of errors (see [1, 4, 9].
They apply security rules to the common model/format.
There are vendors that offer SCA tools (see for example Fortify Software Inc. [see 2, 5]). However, there has been no SCA tool for SAP® ABAP™ Security and Compliance until today, since the ABAP™ language cannot be processed in the before mentioned way. The main reasons are:
ABAP™ has considerably more commands than other languages (Java, C, C++, .NET, PHP, etc.), some of them unique to ABAP™. Therefore ABAP™ doesn't fit into a common model as described above.
In contrast to most other languages, ABAP functions can return more than one value to the caller.
The ABAP™ APIs are delivered as source code together with the SAP© installation and are subject to constant changes due to continuous SAP© release updates. That is the standard functionality remains mostly the same, but the APIs change over time.
The ABAP™ commands vary depending on the release of the SAP® software.
ABAP™ is a vendor proprietary language and the compiler specification is not publicly available. As it is not possible to hook into the compilation process, an alternative approach is required.
The SAP® standard releases provide thousands of standard ABAP™ functions and reports that perform specific and complex business logic. SAP® ships business-related data in thousands of well known tables in the standard releases. In this way, ABAP™ commands and applications are tightly integrated with the SAP® framework, business logic and data (as opposed to J2EE, C/C++ applications etc.).
Database access in ABAP™ is fully integrated in the SAP® kernel. ABAP™ programs do not need use additional database-specific drivers. ABAP™ can make use of an intermediary database access layer, called Open SQL (OSQL), which is in turn SAP® proprietary. As a result, the ABAP™ language syntax has integrated commands that provide access to the database. Database commands based on Open SQL behave totally different than SQL access in other programming languages. As a result, the security risks are different, too.
SAP® computer systems provide integrated features for remote ABAP™ function calls (RFC), in order to perform ABAP™ code execution across distributed servers. The technical implementation/integration of RFC differs greatly from similar concepts in other languages.
The ABAP™ kernel has an integrated authentication and authorization mechanism. ABAP™ commands make use of this mechanism in order to check if users have sufficient authorization(s) to execute any given business logic. This results in problems unique to ABAP™ and requires specific analysis logic by a SCA tool.

There is no common knowledge on ABAP™ security (rules) in the market. The only comprehensive book on ABAP™ security testing was written by employees of Virtual Forge.

ABAP™ different programming paradigms, namely Function Modules, Reports, Programs and Forms, Classes and Methods, Dynpros, Transactions, Business Server Pages, and Web Dynpro ABAP™. Each paradigm requires special consideration by a SCA tool.

SAP® has a proprietary client (SAPGUI) to execute ABAP™ Programs, Reports, Dynpros and Transactions. This requires special consideration for data flow analysis, as SAPGUI applications process user input in a unique, SAP©-specific way. Additionally, ABAP™ commands can directly interact with a client (computer) through SAPGUI by SAP® proprietary mechanisms. This requires special consideration for testing.

SAP® provides two integrated frameworks for Web applications: Business Server Pages (BSP—since release 6.10) and Web Dynpro ABAP™ (WDA—since release 6.40). Both frameworks require special consideration for data flow analysis, as they process user input in a unique, SAP©-specific way.

The ABAP™ source code is stored in database tables, not in the file computer computer system (as is common in other languages). Additionally, the source code for each ABAP™ programming paradigm is stored in a different way and location. This requires a special mechanism to access the source code.

In some ABAP™ programming paradigms, parts of the final ABAP™ code are automatically generated by the SAP framework. This obscures the relation to the original coding and requires special attention by a SCA tool.

Authorizations, computer computer system configuration, etc. is also stored in database tables (with standard names). This opens completely new ways to calculate the business impact of technical defects in the context of the business configuration.

ABAP™ has integrated commands for debugging.

ABAP™ has an interface for calling Java applications (JCo) that is an ABAP program can call a Java program and vice versa.

In light of these complications, the need remains for a SCA tool, apparatus and method for detecting, prioritizing and fixing security defects and compliance violations in SAP® ABAP™ code. Further details regarding the ABAP language are available in standard literature (e.g. [10]).

SUMMARY OF THE INVENTION

This invention is directed to a method of identifying potential security and compliance violations in an ABAP™ software application. The solution resides in a static code analysis (SCA) tool, apparatus and method for detecting, prioritizing and fixing security defects and compliance violations in SAP® ABAP™ code. The preferred method comprises the step of receiving and aggregating ABAP code, meta information and computer system configuration settings associated with a software application. The code, meta information and computer system configuration settings are transformed into an interchangeable format, and the code and metadata are parsed into an execution model. A rules engine identifies security and compliance violations, which are applied to the execution model, and the probability is determined that security and compliance violations exist in the execution model. The findings may be transformed into human-readable representations and/or machine-readable exchange formats.

The ABAP code, meta information and computer system configuration settings are typically received from a SAP© database. The step of transforming may be triggered from within a SAP© computer system or by way of a remote function call. The execution model as well as the probability of findings may be derived from ABAP™ authorization, ABAP™ control flow, and ABAP™ data flow information. The findings may be output by a report generator that provides the findings of the ABAP™ code analysis in various formats, including detailed descriptions about the problem and provide guidance for a solution.

The received code may be enriched with additional metadata about the code and the SAP© computer system, and the step of receiving and aggregating may include resolving component inter-dependencies and extracting all related source code from a SAP© database. The interchangeable format may include aggregated source code, parameters, attributes, comments, code meta information and computer system/meta information. In applying the rules engine to the execution model, an ABAP™-specific analysis may be performed for security defects and compliance violations based on extracted meta information. The rules engine may include information about critical database tables and critical SAP standard functions, and the step of applying the rules engine to the execution model may include the calculation of specific business risks or whether a technical defect has a business-relevant impact. In particular, an asset flow analysis may be used to determine whether critical business data is no longer protected by the computer system. Such critical business data may include credit or debit card numbers, financial data or personal data.

BRIEF DESCRIPTION OF THE DRAWINGS

FIG. 3 is an aggregated representation of class ZVF_PATENT;

FIG. 4 shows the internal format of class ZVF_PATENT;

FIG. 5 shows highlighted data flow in the sample code (untrusted source);

FIG. 7 shows highlighted data flow in sample code (insecure API); and

DETAILED DESCRIPTION OF THE INVENTION

This invention addresses security issues in ABAP™ code with particular emphasis on business impacts arising from the affected SAP® computer system. The invention provides comprehensive techniques for identifying security defects and compliance violations in ABAP™ code, and measuring the impact of those defects in the context of the business configuration and environment. These techniques include data flow analysis and control flow analysis.

The invention provides a knowledge base of critical business functions and critical database content in the SAP® standard (the knowledge base is equivalent to the ABAP specific language rules for security and compliance 401). It checks if user access to critical standard functions and database content is restricted by proper authorization checks in the ABAP™ coding. If not, an unauthorized access has been identified and will be flagged as security violation. The knowledge base can be extended by critical business functions and critical database content in code written by SAP customers ("custom code").

The invention identifies technical security defects in the ABAP™ coding, and has a unique concept of calculating the related business impact. While a technical defect is always a risk, the priority of mitigating this risk depends on the criticality of data that is affected by the defect. The invention has a knowledge base of critical database tables and standard SAP® functions. Based on this knowledge base, the business criticality of any given technical defect can be assessed precisely. This allows identifying issues that pose a high business risk and perform mitigation in a prioritized way. Also this mechanism allows identifying compliance violations.

The invention introduces a completely new analysis mechanism, which the inventors call asset flow analysis (AFA). The difference between data flow and asset flow is as follows: while a data flow follows the path from an external source to an internal sink in order to analyze whether input is fed into a critical function, the asset flow determines whether critical data leaves a computer system and therefore is no longer protected by mechanisms of the computer system. In general, asset flow analysis can be used to identify read access to critical business data (like credit card numbers) and visualize the subsequent use of this data. This allows identifying ABAP™ code that accesses critical data and visualizes in what context this data is used. Asset flow analysis greatly helps identifying back doors related to information leaks and data processing that does not adhere to compliance standards. It adds unique value to the security analysis of business applications.

Figure 1:
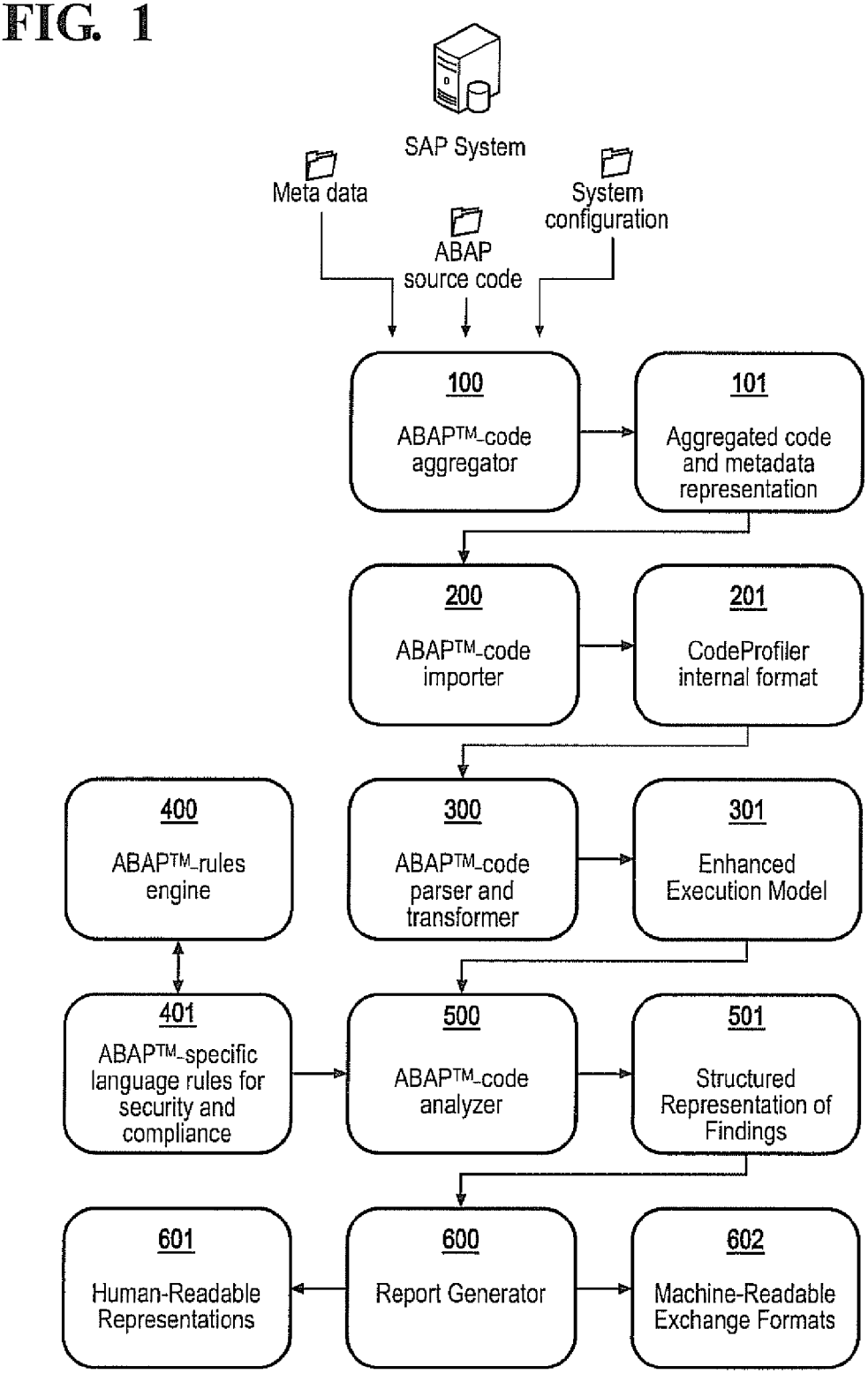
FIG. 1 is a simplified flow diagram depicting the preferred embodiment of the invention.

FIG. 1 shows the components of the invention, the interaction of which will now be described in detail. Component 100, the ABAP™-code aggregator, collects code, code meta information and computer system configuration settings from the SAP© database, and transforms the distributed SAP internal representation of this information into a complete, aggregated, interchangeable format 101. The transformer can be triggered from within the SAP© computer system or externally, e.g. via RFC (Remote Function Call—SAP's mechanism to call function modules in another SAP computer system or in an external application).

The ABAP™-code and metadata importer 200 imports the previously extracted interchangeable representation into a built-in database. The database table model has been specifically created to store parsed ABAP code and related meta data in the most efficient way for analysis, the enhanced execution model. The ABAP™-code parser 300 parses the ABAP™ interchangeable representation and transforms it into an enhanced execution model to simplify rules analysis. The enhanced execution model is stored in the internal database and also contains ABAP™ authorization, ABAP™ control flow, and ABAP™ data flow information.

Rules engine 400 covers test domains such as security and compliance violations. These rules have been researched by the inventors in years of code analysis. The ABAP™ code analyzer 500 applies rules from the rules engine to the enhanced ABAP™ execution model. The probability of findings is computed based on ABAP™ authorization, ABAP™ control flow, ABAP™ data flow information as well as modification of the data. The impact is based on information in the rules engine. Report generator 600 provides the findings of the ABAP™ code analysis in various formats. The findings include detailed descriptions about the problem and provide guidance for a solution.

The ABAP™-code aggregator 100 collects the ABAP™ source code of the various ABAP™ programming paradigms by resolving component inter-dependencies and extracting all related source code from the SAP© database. This source code is enriched by the invention with additional metadata about the code itself (e.g. function parameters which are not directly included in the source code, RFC-flags of function modules, authorization groups . . . ) and the SAP computer system (e.g. SAP release, Roles and Authorizations, Authorizations for transactions, relations between reports and transactions, active services, logs, etc.).

Since code and code meta information in a SAP© ABAP™ computer system is distributed across many database tables, the code collection/extraction itself is based on considerable research carried out by the inventors. Each ABAP™ paradigm is stored in a different way in the SAP© database. For each, the inventors had to determine in which specific format and in which table the source code is stored. Since the SAP© server provides integrated code versioning and distinguishes between active and inactive code variants, these factors had to be considered as well. Also, the inventors had to analyze where the respective meta information (e.g. method parameters, method declarations, class interfaces, super classes, related authorization objects, related logical databases . . . ) are stored and in what way this relation is technically represented (in the database) on the SAP© server. The ABAP™ code fragments and their meta information that are originally diversely distributed in the SAP© database are actually transformed into a complete, aggregate, portable ABAP™ and metadata representation 101. This representation includes aggregated source code, parameters, attributes, comments, code meta information and computer system/meta information.

Figure 2:
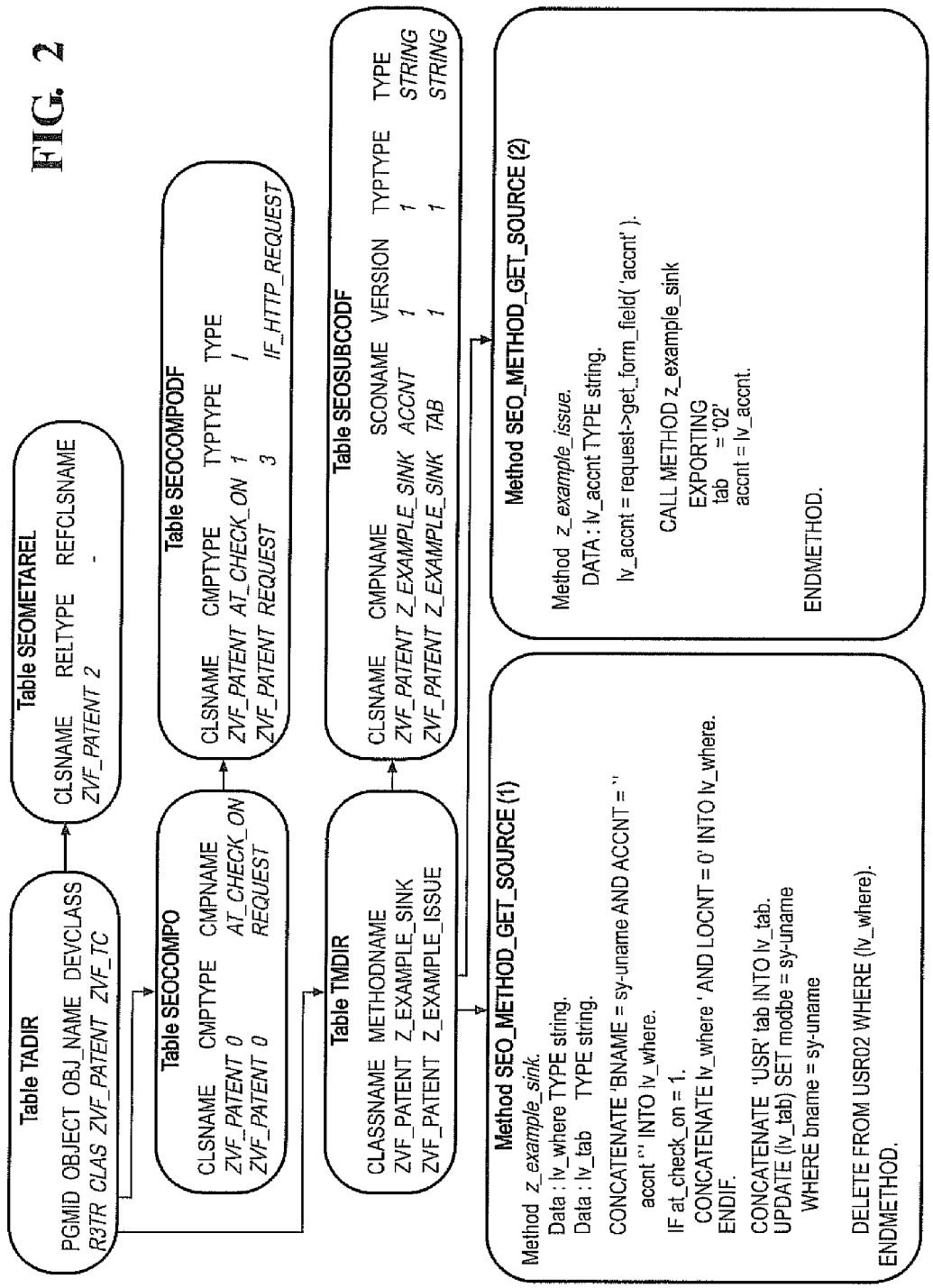
FIG. 2 illustrates code fragmentation of example class ZVF_PATENT in the SAP® database.

For demonstration purposes we describe in the following how a sample ABAP class called ZVF_PATENT is processed by the invention. The schematic of FIG. 2 shows the code fragmentation in the SAP© database based on our example ABAP class (ZVF_PATENT), which has two class attributes (at_check_on and request) and two class methods (z_example_issue and z_example_sink). The schematic shows the relations between database tables that hold code fragments as well as an SAP© API function (SEO_METHOD_GET_SOURCE) that provides the source code of a single method. In order to extract this class, the invention first searches for the name of the class in SAP table TADIR, which contains a list of all ABAP code objects. Once the existence is confirmed, potential relations (super-classes or sub-classes) of this class are looked up in table SEOMETAREL. In the example, there are neither super-nor sub-classes. Next, the class variables of ZVF_PATENT are looked up in table SEOCOMPO. The relevant table keys are CLSNAME (the name of the class) and CMPTYPE 0 (indicating a class variable). The variables' names are stored in column CMPNAME. The data type of each identified variable is then read from table SEOCOMPODF. The relevant table keys are CLSNAME (the name of the class) and CMPNAME (the name of each method). The column TYPTYPE indicates if the variable is of simple type (1) or an object reference (3), column TYPE determines the actual ABAP variable type. Once the class variables have been identified, the class methods are read from table TMDIR. The relevant table key is CLASSNAME (the name of the class). The column METHODNAME holds the name of any given method. For each method identified this way, the method parameters are read from table SEOSUBCODF. The relevant table keys are CLSNAME (the name of the class) and CMPNAME (the name of each method). The column SCONAME holds the name of a parameter. The column TYPTYPE indicates if the variable is of simple type (1) or an object reference (3), column TYPE determines the actual ABAP variable type. All information about the class is aggregated in the ABAP™ and metadata representation 101. As a final step, the actual source code of each identified class method is read from the SAP database. This is done via the SAP standard method SEO_METHOD_GET_SOURCE which requires the method and class name as input. The source code is subsequently added to the ABAP™ and metadata representation 101. In a basic, aggregated form built in accordance with the invention, the code of FIG. 2 looks like the schema of FIG. 3.

The ABAP™-code importer 200 imports the aggregated code and metadata representation 101 into the CodeProfiler internal format 201, which is basically an in-memory representation of the aggregated code and metadata representation 101. This internal format was designed to represent data in a way that subsequent read and write access by the parser takes place with minimal performance-impact. Performance is important, since an SAP® computer system can contain more than 160 million lines of standard code. This standard code has to be analyzed as well, since practically all custom ABAP™ code calls SAP© standard code (APIs) and the whole data/control flow—from the custom code to the standard code—has to be considered. The internal format 201 of ZVF_PATENT is shown in FIG. 3.

The code in the internal format 201 is then parsed and transformed by the ABAP™ code parser and transformer 300 into an Enhanced Execution Model 301. This model is stored in a database and contains ABAP™ meta-information. It also describes data transports between different variables and functions as a basis for the ABAP™ data flow model. In order to build the Enhanced Execution Model 301, the parser analyzes the source code, module by module. A module in this context is a given ABAP function, subroutine, class method, report etc. The parser first identifies all variables per module and stores their source code positions in the database. The parser then relates read access to a (source) variable to the corresponding write access to a (destination) variable per ABAP command as transitions in the database. In order to construct a data flow, the parser then relates the various data transitions between the different commands per code module to each other in the order of the control flow in the database. This generates several database tables, representing a data-flow graph inside a given code module. We do not explain the principle of data flow analysis in further detail here, since this mechanism is well known and has been described publically several times (see for example [1,4,7]). However, we show the special methods for conducting data and control flow analysis in ABAP programs.

In the following, we highlight special considerations for performing data flow analysis in ABAP, which the invention makes use of.

First, the parser adds information about SAP authorization checks in the control flow of any given code module. Based on the local data flow graphs, the parser then builds a call graph between the different code modules by relating all commands that call other code modules to the called code module. In ABAP, this requires consideration of the meta data extracted from the SAP database: The parameters of any code module have to be connected to the data flow transitions. Do to so, the parameters which are not stored in the source code have to be read from the meta information of any given code module that have been previously extracted. As a result of this step, the invention builds a complete call graph of the entire SAP standard coding, together with any given custom coding which is part of the inspection and any relevant SAP authorization checks detected in the code. This complete call graph represents a solid basis for all further analysis based on the rules provided by the ABAP™-rules engine 400.

In order to build a data flow graph, the parser needs to consider specialties in the ABAP language. Whereas in most other languages data flow is mostly propagated by API functions, in ABAP most data flows are caused by commands, that are implicitly a part of the ABAP language itself. Therefore the parser needs to consider all ABAP commands that exchange data locally and in the ABAP shared memory. Commands that exchange data in shared memory are e.g. SET PARAMETER, GET PARAMETER, EXPORT TO DATABASE, IMPORT FROM DATABASE, EXPORT TO DATA BUFFER, IMPORT FROM DATA BUFFER, EXPORT TO MEMORY ID, IMPORT FROM MEMORY ID, EXPORT TO SHARED BUFFER, IMPORT FROM SHARED BUFFER, EXPORT TO SHARED MEMORY, IMPORT FROM SHARED MEMORY, EXPORT TO INTERNAL TABLE, IMPORT FROM INTERNAL TABLE. Commands that exchange data locally are e.g. CONCATENATE, MOVE, REPLACE, ASSIGN, SPLIT, APPEND, APPEND TO itab, LOOP AT itab, INSERT INTO itab, MODIFY itab, READ TABLE. Also the parser adds information about (external) data sources to the data flow. Data sources are special variable sources that carry input, e.g. a value read from the user interface or from an RFC enabled function module. The list of data sources as well as their type is defined in the ABAP™-rules engine 400.

Figure 6:
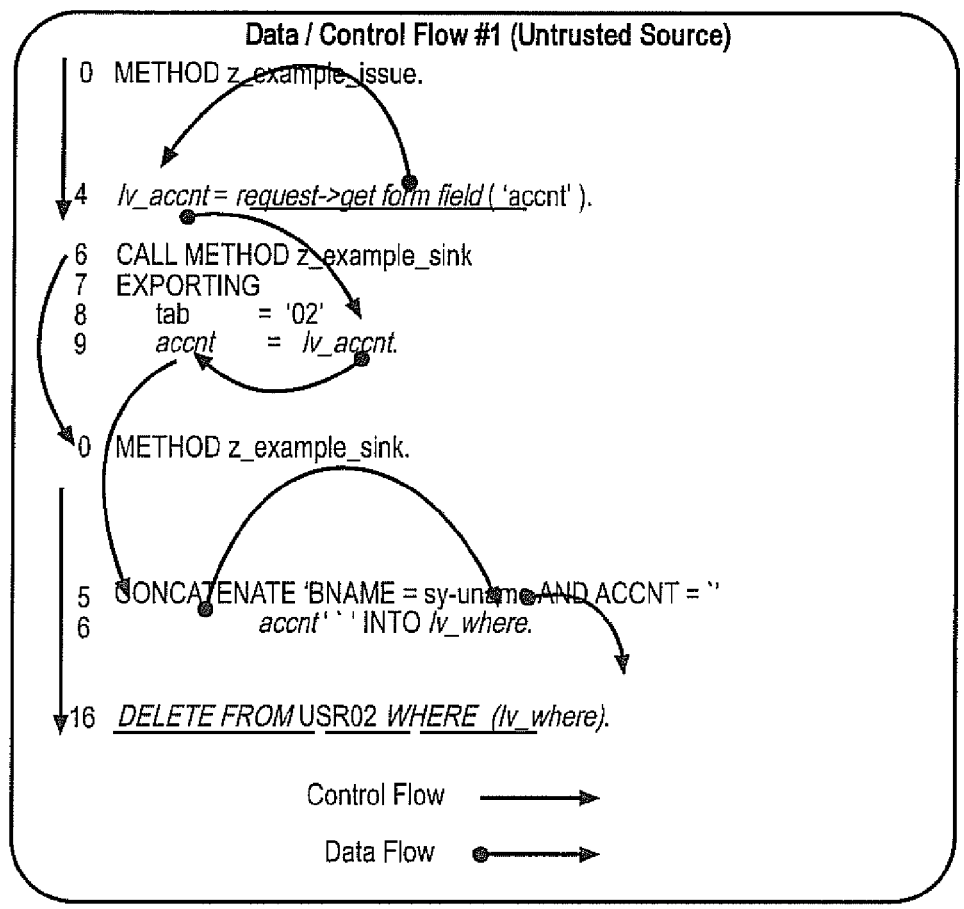
FIG. 6 shows the concept of compact data and control flow graphs in the sample code (untrusted source)

The Enhanced Execution Model 301 was designed to perform control and data flow analysis operations only once during a security analysis, in order to optimize performance and to keep memory resources small. Therefore, a complete control and data flow graph of the entire source code is created and persisted in the database in a compact format by the parser. An example for data and control flow graph and its compact representation is shown in FIGS. 5 and 6 as well as in FIGS. 7 and 8. This performance/resource optimization is required in order to scan a complete SAP computer system in one run, which can contain more than 160 million lines of code. The ability to scan an entire computer system in one run is important since SAP© AG continuously releases service packs and hotfixes for its various computer system lines. This in return results in constant changes in APIs. Since ABAP™ developed by SAP© customers and consulting companies always uses SAP© standard APIs, the standard functions must be part of a security analysis in order to deliver reliable results. Therefore, only a complete computer system scan ensures that the behavior of the code base installed on any given SAP© computer system is analyzed correctly. An isolated scan of custom code without considering the current SAP© APIs on the affected SAP© would not return correct results.

The ABAP™-rules engine 400 contains ABAP™-specific language rules for security and compliance tests 401 and provides methods to maintain and customize these rules. The standard rules represent an essential aspect of the invention, as they contain completely new, ABAP™-specific testing approaches ("test cases") researched by the inventors. These test cases address unique functional concepts of an SAP© computer system which have corresponding functionality in the ABAP™ language. Examples are client separation in the SAP© database, semantic correctness of authority checks, commands and business logic that require prior authorization checks, access to SAP© kernel-level functions, implicit authority checks in logical databases, data exchange via the shared memory, data exchange via SPA/GPA Parameters, dynamic ABAP™ commands, commands that perform server to client communication, commands that perform server to server communication (via RFC or CPIC), dynamic generation of ABAP programs, checks related to computer system variables (e.g. SY-UNAME, SY-SYSID, SY-OPSYS, SY-MANDT, SY-DATUM), generic Open SQL table queries, hidden code, unmanaged/native SQL commands.

The rules engine also includes information about critical database tables (e.g. tables holding HR data or financial data) and critical SAP© standard functions (e.g. dangerous Kernel modules or function modules marked as SAP© internal). The rule set is adapted to changes of the ABAP language and SAP standard functions.

The ABAr-code analyzer 500 applies the ABAP™-specific language rules 401 from the rules engine 400 to the Enhanced Execution Model 301. It performs an ABAP™-specific analysis for security defects and compliance violations, based on technical effects in the code and the extracted meta information. Most importantly, the invention computes a risk rating for any given defect it discovers.

All security issues reported by the invention have a risk rating. This risk rating helps users to better understand the criticality of any given issue. This is very helpful for prioritizing which issues have to be addressed first, in case a large number of vulnerabilities are discovered. The risk rating ranges from * (low risk) to **** (very high risk). The risk rating is computed by the impact and probability of a given issue.

The impact of a security issue is initially assigned the default value of the corresponding test case, as defined in the Rules Engine 400. This default value can be customized. The impact determines how critical an exploit of the discovered issue would be, i.e. it describes the severity of the damage. It ranges from low (lowest) to very high (highest). Certain circumstances can influence the initial default rating (standard, as well as customized). These circumstances are described in the following and grouped by topic and illustrate our risk rating algorithm by examples.

Test cases that identify dangerous Open SQL practices (e.g. Open SQL Injection) check the name of database table affected by the Open SQL command in any given issue. The Rules Engine 400 contains a list of critical tables and adjusts the impact, in case one of these tables is affected. An issue that involves a critical table will usually be raised to very high impact.

Test cases that check for ABAP kernel calls check the name of the kernel call in any given issue. The Rules Engine 400 contains a list of critical kernel calls and adjusts the impact, in case one of these tables is affected. An issue that involves a critical kernel call will usually be raised to very high impact.

Test cases that involve transactions (e.g. Missing AUTHORITY-CHECK before CALL TRANSACTION) check the name of the affected transaction. The Rules Engine 400 contains a list of critical and uncritical transactions and adjusts the impact, in case one of these is affected. An issue that involves a critical transaction will usually be raised to very high impact, whereas an issue that involves an uncritical transaction (a transaction everyone is entitled to call, e.g. ABAPDOCU) will be reduced to low impact.

Test cases that check for hard-coded user names analyze, if the affected user name is listed in the Rules Engine 400. Basically all standard users are listed that cannot be assigned to real users (e.g. SAP*). Therefore, a user's privileges are never escalated in case such a name is hard-coded. If the hard-coded user name is in this list, the impact of the issue is reduced to Low.

The probability of a finding determines, how likely an attacker can actually exploit a security vulnerability. It ranges from Low (least likely) to Very High (most likely). The probability depends on the type of test case. For simple pattern findings (e.g. Cross-Client Access to Business Data), the probability is set to the adjusted impact value per default, since the vulnerability in this case is not depending on input. Some test cases consider the presence of an authority check when computing probability. This behavior is explicitly mentioned in those test cases.

For data flow test cases, the probability is computed dynamically. Two main factors influence the probability: the type of source (data origin) and the type of data modification. The six types of sources (data origins) and their effect on probability are described in the following.

(1) "Untrusted Source" means that input from an untrusted source (e.g. SAP-GUI input field, Webpage, RFC parameter, etc.) is routed to a potentially critical ABAP command. By means of an untrusted source, a malicious user can directly feed input to an SAP computer system. Rated as Very High probability.

(2) "Indirect Source" means that input fed to a potentially critical ABAP command originates from a source that may have been influenced by a malicious user. Such an indirect source can e.g. be the contents of a file. In such a case, the likeliness of an exploit depends on the malicious user's access to the indirect source. Rated as High probability.

(3) "Insecure API (direct)" indicates that a parameter of a function module, form, report or method (in general referred to as a module) is routed to a potentially critical ABAP command located within the same module. However, it is unclear if the affected module is called by other code that feeds (external) input to it. Rated as Medium probability. An example of a data and control flow graph and its compact representation for an untrusted source is shown in FIGS. 5 and 6.

Figure 8:
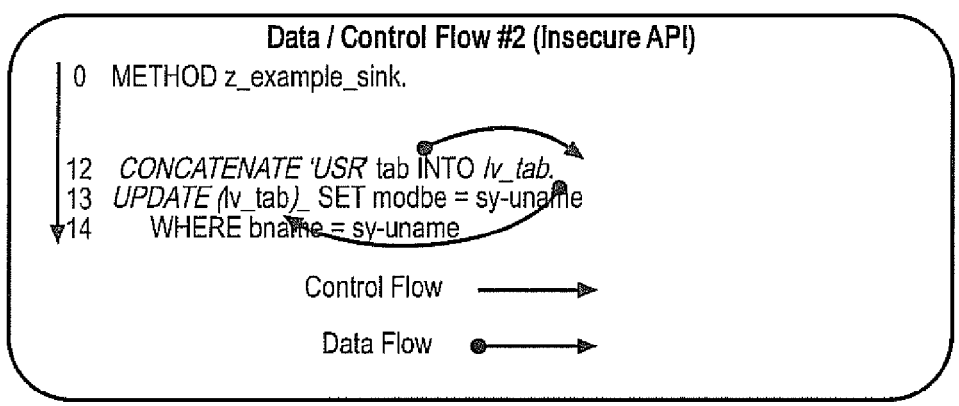
FIG. 8 shows the concept of compact data and control flow graphs in the sample code (insecure API).

(4) "Insecure API (indirect)" indicates that a parameter of a function module, form, report or method (in general referred to as a module) is routed to another module that is considered to be an insecure API. In such a case the calling module also becomes an insecure API, as it propagates its parameters to an insecure API. This is rated as Medium probability. An example of a data and control flow graph and its compact representation for an insecure API is shown in FIGS. 7 and 8.

(5) "Unknown Source" indicates that a parameter is returned by a function module, form, report or method (in general referred to as a module) for which no source code is available for analysis. In such a case, it is not possible to determine where the data comes from, as its origin is unknown. Rated as Medium probability.

(6) "No Source" indicates an occurrence of a potentially critical ABAP command that processes input but is not part of any other finding. In this case, no relevant source of data could be found that is fed to the critical command, i.e. the command most probably can't be misused. This may still be a problem, if the general usage of the given command is in violation of the ABAP security guidelines. Rated as Low probability.

Data modifications are can also influence the probability of data flow test cases. The invention checks if a prefix or a postfix is concatenated to an input string. If input is modified before it is fed to a Sink, the chances of an exploit may be reduced. For example, in a test case like "Generic ABAP Module Calls" an attacker needs to specify the entire name of the module to call in order to exploit a vulnerability. But if a prefix if concatenated to the input (e.g. 'ZTMP_') then only modules that start with this sequence can be called. This reduces the chance of exploitation, since the number of vulnerable resources is significantly reduced. Therefore, depending on the test case, a relevant prefix as well as a relevant postfix will each reduce the probability by 50 percent. Note that almost all injection-type vulnerabilities are not affected by prefix and postfix modification. Therefore, their probability is not changed in such a case. An example of a prefix is shown in FIGS. 7 and 8

A Structured Representation of Findings 501 is generated that allows for prioritization by reflecting the computed business criticality per issue.

The Report generator 600 reads the structured representation of the findings 501 and transforms them into Human-Readable Representations (e.g. PDF documents, and results in a user interface) 601 as well as Machine-Readable Exchange Formats (e.g. XML files) 602 that can be used to feed external bug tracking computer systems or dashboards.

REFERENCES

1. Böhm, Jacopini. "Flow diagrams, wring machines and languages with only two formation rules" Comm. ACM, 9(5):366-371, May 1966.
2. Brian Chess and Gary McGraw. Static analysis for security. IEEE Security and Privacy, 2(6):76-79, 2004.
3. Patrick and Radhia Cousot, Abstract interpretation: a unified lattice model for static analysis of programs by construction or approximation of fixpoints. ACM POPL 1977.
4. Dahl & Dijkstra & Hoare, "Structured Programming," Academic Press, 1972.
5. Fortify Software, Inc., U.S. Pat. No. 7,207,065, Apparatus and method for developing secure software, Issued on Apr. 17, 2007
6. Benjamin Livshits, section 7.3 "Static Techniques for Security," Stanford doctoral thesis, 2006.
7. Hanne Nielson, Flemming Nielson, and Chris Hankin. Principles of Program Analysis. Springer 1999.
8. Markus Schumacher, Security Engineering with Patterns, pp. 153-154, Lecture Notes in Computer Sciens, Springer Verlag, 2003
9. Zahn, C. T. "A control statement for natural top-down structured programming" presented at Symposium on Programming Languages, Paris, 1974.
10. Horst Keller, Wolf Hagen Thümmel, Official ABAP Programming Guidelines, SAP PRESS, 2009

The invention claimed is:

1. A method of identifying potential security and compliance violations in an business software application, comprising the steps of:
   receiving and aggregating business software code, meta information and computer system configuration settings associated with a software application;
   providing a rules engine operative to identify security and compliance violations; and
   providing a computer system to perform the following steps:
   transform the code, meta information and computer system configuration settings into an interchangeable format;
   parse the code and metadata into an execution model;
   apply the rules engine to the execution model;
   compute the probability that security and compliance violations exist in the execution model; and
   output the findings of the computation to a user.

2. The method of claim 1, wherein the business software code, meta information and computer system configuration settings are received from a database associated with enterprise software used for managing business applications.

3. The method of claim 1, wherein the step of transforming is triggered from within an enterprise computer system used for managing business applications.

4. The method of claim 1, wherein the step of transforming is triggered from a remote function call.

5. The method of claim 1, wherein the execution model contains business software authorization, control flow, and data flow information.

6. The method of claim 1, wherein:
   the execution model contains business software authorization, control flow, and data flow information; and
   the probability of findings is based on the business software authorization, control flow and data flow information.

7. The method of claim 1, wherein the findings are output by a report generator that provides the findings of the business software code analysis in various formats.

8. The method of claim 1, wherein the results include detailed descriptions about the problem and provide guidance for a solution.

9. The method of claim 1, wherein the step of receiving and aggregating includes resolving component inter-dependencies and extracting all related source code from a database associated with enterprise software used for managing business applications.

10. The method of claim 1, wherein the received code is enriched with additional metadata about the code and an enterprise computer system used for managing business applications.

11. The method of claim 1, wherein the interchangeable format includes aggregated source code, parameters, attributes, comments, code meta information and computer system/meta information.

12. The method of claim 1, wherein the step of applying the rules engine to the execution model performs business-software-specific analysis for security defects and compliance violations based on extracted meta information.

13. The method of claim 1, wherein:
   the rules engine includes information about critical database tables and critical standard functions; and
   the step of applying the rules engine to the execution model includes the calculation of specific business risks.

14. The method of claim 1, further including the step of deteimining if a technical defect has a business-relevant impact.

15. The method of claim 1, including the step of performing an asset flow analysis to determine whether critical business data is no longer protected by the computer system.

16. The method of claim 15, wherein the critical business data includes credit or debit card numbers, financial data or personal data.

17. The method of claim 1, wherein the findings are transformed into human-readable representations and machine-readable exchange formats.

* * * * *